(12) United States Patent
Dijkstra

(10) Patent No.: US 8,899,615 B2
(45) Date of Patent: Dec. 2, 2014

(54) CHILD BUGGY AND STORAGE ELEMENT THEREFOR

(75) Inventor: Aernout Mattys Dijkstra, Apeldoorn (NL)

(73) Assignee: Royalty Bugaboo GmbH, Zug (CH)

(*) Notice: Subject to any disclaimer, the term of this patent is extended or adjusted under 35 U.S.C. 154(b) by 644 days.

(21) Appl. No.: 13/126,055

(22) PCT Filed: Oct. 23, 2009

(86) PCT No.: PCT/NL2009/050643
§ 371 (c)(1),
(2), (4) Date: Jul. 20, 2011

(87) PCT Pub. No.: WO2010/047596
PCT Pub. Date: Apr. 29, 2010

(65) Prior Publication Data
US 2011/0272925 A1    Nov. 10, 2011

(30) Foreign Application Priority Data
Oct. 24, 2008 (NL) ..................................... 2002138

(51) Int. Cl.
*B62B 9/00* (2006.01)
(52) U.S. Cl.
USPC .......................................... 280/658; 280/42
(58) Field of Classification Search
USPC ............ 280/33.991, 33.992, 33.993, 638, 35, 280/643, 647, 648, 650, 657, 658, 47.34, 280/47.35, 47.38, 42; 188/20; 297/452.4
See application file for complete search history.

(56) References Cited

U.S. PATENT DOCUMENTS

| | | | | |
|---|---|---|---|---|
| 1,707,186 A | * | 3/1929 | Chatfield | 280/658 |
| 3,759,572 A | * | 9/1973 | Koepke | 297/452.4 |
| 4,290,620 A | * | 9/1981 | Chika | 280/209 |
| 4,984,768 A | * | 1/1991 | Kolber et al. | 297/16.1 |
| 5,176,395 A | | 1/1993 | Garforth-Bles | |
| 5,292,144 A | * | 3/1994 | Sosnoff | 280/304.1 |

(Continued)

FOREIGN PATENT DOCUMENTS

| | | |
|---|---|---|
| BE | 1 014 755 A6 | 3/2004 |
| GB | 2 193 692 A | 2/1988 |
| NL | 1 029 722 C1 | 2/2007 |
| WO | 2006/015122 A2 | 2/2006 |

OTHER PUBLICATIONS

International Search Report, dated May 20, 2010, from corresponding PCT application.

*Primary Examiner* — Katy M Ebner
*Assistant Examiner* — Brodie Follman
(74) *Attorney, Agent, or Firm* — Young & Thompson

(57) ABSTRACT

A carriage for transporting infants, includes a frame which is provided with first fastening elements to be used for detachably fastening a first load, which first load includes a first holder, the width of the frame being adjustable between a first, relatively small frame width and a second, relatively large frame width, the frame being provided with second fastening elements to be used for detachably fastening, in both the first frame width and the second frame width, a second load next to the first load. There is also described a carriage with a frame which is provided with fastening elements to be used for detachably fastening a holder in which one or more infants may be transported, the width of the frame being adjustable between a small and a large frame width and the width of the holder being also adjustable between a small and a large holder width.

15 Claims, 9 Drawing Sheets

(56) References Cited

U.S. PATENT DOCUMENTS

| | | | |
|---|---|---|---|
| 5,361,569 A * | 11/1994 | Schupman et al. | 56/228 |
| 5,562,300 A * | 10/1996 | Nelson | 280/655.1 |
| 5,564,786 A * | 10/1996 | Peek et al. | 297/452.4 |
| 5,772,223 A * | 6/1998 | Letourneau | 280/47.131 |
| 6,033,026 A * | 3/2000 | Tseng | 297/452.4 |
| 6,352,307 B1 * | 3/2002 | Engman | 297/284.11 |
| 6,428,034 B1 * | 8/2002 | Bost | 280/650 |
| 6,431,579 B1 * | 8/2002 | Kaneko et al. | 280/642 |
| 6,513,827 B1 * | 2/2003 | Barenbrug | 280/648 |
| 6,550,802 B2 * | 4/2003 | Sheehan | 280/658 |
| 6,676,140 B1 * | 1/2004 | Gondobintoro | 280/33.993 |
| 6,752,405 B1 * | 6/2004 | Wright | 280/47.38 |
| 6,820,891 B2 * | 11/2004 | Suga | 280/642 |
| 7,267,359 B1 * | 9/2007 | Yang et al. | 280/642 |
| 7,516,966 B2 * | 4/2009 | Gray | 280/47.38 |
| 7,757,819 B2 * | 7/2010 | Chen | 188/20 |
| 8,061,732 B2 * | 11/2011 | Song et al. | 280/650 |
| 8,087,689 B2 * | 1/2012 | Fritz et al. | 280/647 |
| 8,157,273 B2 * | 4/2012 | Bar-Lev | 280/47.39 |
| 8,205,907 B2 * | 6/2012 | Chicca | 280/642 |
| 8,231,136 B2 * | 7/2012 | Fiore, Jr. | 280/648 |
| 8,262,103 B2 * | 9/2012 | Enserink et al. | 280/31 |
| 8,398,143 B1 * | 3/2013 | Haley | 296/65.06 |
| 8,444,171 B2 * | 5/2013 | Smith et al. | 280/649 |
| D686,541 S * | 7/2013 | Lai | D12/129 |
| 2002/0070531 A1 * | 6/2002 | Sheehan | 280/647 |
| 2006/0091706 A1 * | 5/2006 | Christofferson et al. | 297/130 |
| 2009/0206566 A1 * | 8/2009 | Enserink et al. | 280/35 |
| 2010/0038887 A1 * | 2/2010 | Bar-Lev | 280/658 |
| 2010/0052277 A1 * | 3/2010 | Zehfuss | 280/47.35 |
| 2011/0048867 A1 * | 3/2011 | Solinski et al. | 188/20 |
| 2011/0175330 A1 * | 7/2011 | Smith et al. | 280/649 |
| 2011/0272925 A1 * | 11/2011 | Dijkstra | 280/658 |
| 2012/0126513 A1 * | 5/2012 | Kent et al. | 280/650 |
| 2013/0106159 A1 * | 5/2013 | Johansson | 297/353 |
| 2013/0270800 A1 * | 10/2013 | Chiang | 280/658 |

* cited by examiner

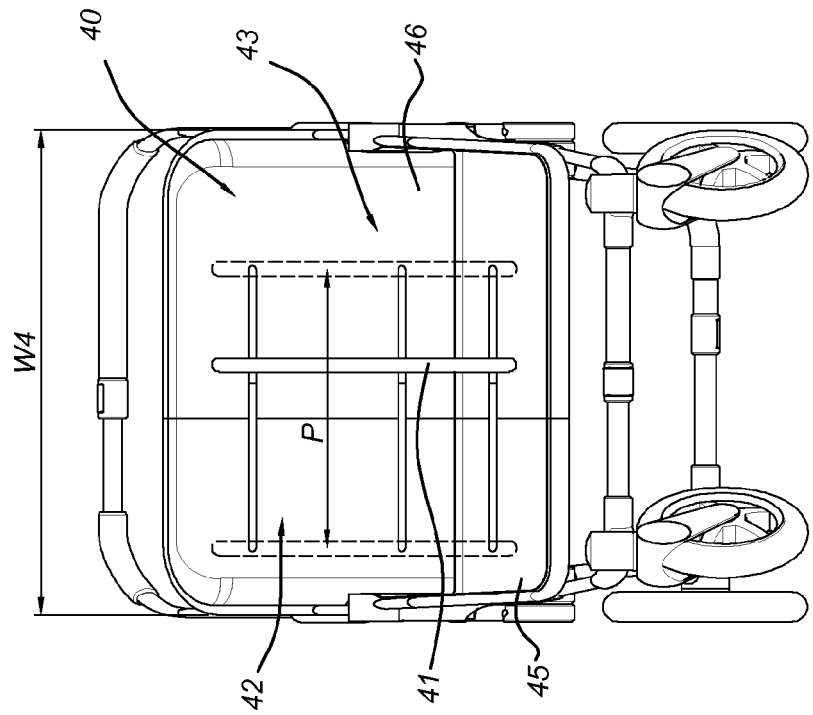
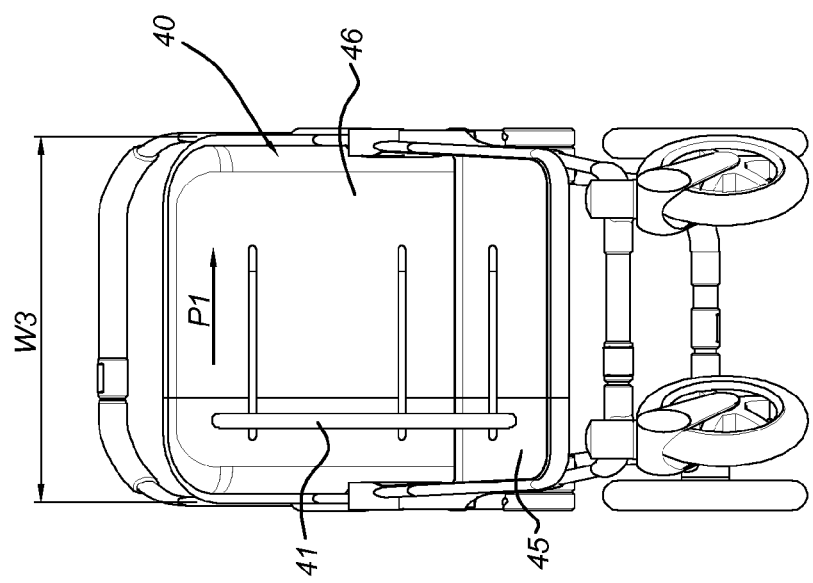

CHILD BUGGY AND STORAGE ELEMENT THEREFOR

The invention relates to an child buggy comprising a frame which is provided with first fastening elements to be used for detachably fastening a first load to the frame, which first load comprises a first holder for placing an infant therein, the width of the frame being adjustable between a first width and a second width, the frame being provided with second fastening elements to be used for fastening a second load next to the first load. The invention also relates to a storage element for the aforementioned child buggy's.

A child buggy of this type may be regarded as being known from GB 2 193 692 A. The known child buggy consists of a frame made of telescopic rods. The width of the child buggy is adjustable in this way. In a narrow state, the child buggy can be provided with one infant seat. In the wide state, a second infant seat can subsequently be placed next to the first seat.

The known child buggy has the drawback of being relatively inflexible. The child buggy can be used for transporting one infant, or for transporting two infants. It is relatively laborious to carry baggage, such as for example a nappy bag or a shopping bag, in addition to the infant or infants. It is possible to fasten a bag of this type to the frame, for example to the push rod thereof, but this ensures that the stability and road holding of the child buggy are influenced in an adverse manner. In addition, the bag is difficult to access in a position of this type. It is also known to attach baggage in a storage space provided under the infant seat. However, this storage space is fairly difficult to access.

Another drawback of the known child buggy is the fact that an additional infant seat has to be positioned when more than one infant has to be transported in the child buggy. Furthermore, both infant seats are intended for transporting infants of substantially the same size, in particular the same width. After all, the infant seats are both the same size. The known child buggy is therefore in practice unsuitable for transporting a combination of a large infant and a small infant.

The known child buggy has the further drawback of not being particularly robust, particularly when the frame is brought to the maximum width.

Belgian document BE 1 014755 A6 describes a child buggy for transporting an approximately 3 year-old infant in a seat. The seat is fastened to a movable chassis. Furthermore, the chassis is embodied so as to be collapsible. The chassis comprises for this purpose a number of rods which can be retracted and extended telescopically in order to adapt the chassis to the dimensions of the child buggy. A fastening hook, to which a loose baby seat can be fastened, is provided on the back of the chassis, at the point at which the user grasps the carriage in order to advance the carriage. In order to ensure that the overall structure remains stable when the infant gets out of its seat, a number of legs are provided next to the wheels. The carriage is unable to travel when the legs are folded out. However, the child buggy remains less stable when travelling with more than one infant.

It is an object of the present invention to provide a child buggy which solves or at least reduces at least one of the aforementioned drawbacks of the known child buggy and/or any other drawbacks of the known child buggy's.

It is also an object of the present invention to provide a relatively flexible and easily accessible storage element for a child buggy of this type.

It is a further object of the invention to provide a child buggy which has a wide range of applications, is simple in its construction and/or is suitable for transporting infants of different sizes.

At least one of the abovementioned objects is achieved, according to a first aspect, in a carriage for transporting infants of the type mentioned at the outset, which is characterized in that the frame is provided with second fastening elements to be used for detachably fastening, in both the first width and the second width, a second load next to the first load. The child buggy is extremely flexible as a result of the fact that a load can be placed, both in the first frame width and in the second framework, next to the first load. Furthermore, the stability of the child buggy can be improved as a result of the fact that, in the first frame width, the child buggy is much wider than the width of the first load (for example a holder for holding an infant). Furthermore, it is impossible to carry, in all widths of the child buggy, an additional load, as well as transporting one infant.

The second load can for example comprise a storage element for placing goods, such as for example shopping, therein. The second load can then be placed in both the first width and the second width. As a result of the fact that the storage element can be placed next to the first load, the storage element is placed relatively low in the construction and the centre of gravity of the child buggy is also relatively low. This benefits the stability of the child buggy. In addition, the storage element can be fastened to the frame so as to be relatively motionless, thus preventing oscillating of the load. In the known child buggy, this oscillating leads to instability and impaired road holding, and can even cause the child buggy to fall over.

The second load can comprise a second holder for placing an infant therein, which, in a second width of the frame, can be placed thereon. This ensures that the child buggy is suitable to be used for transporting two infants when the child buggy is in the second width.

In one embodiment, the storage element and the second holder can be placed alternately on the frame. It is in this case possible for there to be able to be placed in a first width of the frame the storage element on the child buggy, and in a second width of the frame the second holder for an infant. This provides a flexible child buggy: in the first width an infant can be transported together with the storage element, and in the second width two infants can be transported.

It is possible for, in a second width of the frame, the storage element and the second holder to be able to be placed in an exchangeable manner. This allows the child buggy to be widened to a second width in order subsequently to make use of the storage element. The widening increases the stability of the child buggy, and makes it possible to carry relatively heavy things, such as for example shopping, in a safe and stable manner using the child buggy.

In one embodiment, the width of the storage element is adjustable. This allows the storage element to be made larger or smaller, depending on a user's needs to carry more or fewer items with him. It is, in addition, also possible to use the storage element in a wide state when the frame of the child buggy is used in a second width.

In one embodiment, a width of the second holder is at least roughly equal to a width of the first holder. In this way, two holders having roughly the same dimensions can be used in the wide state of the frame.

It is possible for the ratio between the width of the first holder, for placing an infant therein, and the width of the frame in a first width to be greater than 50% and to be less than 80%.

According to a further aspect of the invention, at least one of the abovementioned objects of the invention is achieved in a carriage for transporting infants, comprising a frame which is provided with fastening elements to be used for detachably fastening a holder in which one or more infants may be transported, the width of the frame being adjustable between a first, relatively small frame width and a second, relatively large frame width and the width of the holder being also adjustable between a first, relatively small holder width and a second, relatively large holder width. The fact that the width of the holder is also adjustable allows more or less space (in the width direction) to be obtained in the holder. When, for example, more than one infant has to be transported, the holder can easily be widened, so that there is sufficient space for each of the infants in the holder. When a relatively stocky infant has to be transported, the holder can be widened, thus giving the infant more space in the holder. In cases in which the infant carrier has to be given temporarily a higher degree of stability (by increasing the size of the wheel base), for example when it is necessary to travel over uneven terrain, the holder can in a further embodiment be widened at the same time as the widening of the frame. In a specific embodiment, the adjustment of the frame width substantially corresponds to the adjustment of the holder width. This means that the change in width of the frame is substantially equal to the change of the width of the holder.

According to a further embodiment, the holder of the child buggy is provided with an intermediate wall for providing two separate holder compartments, in each of which an infant can be placed. The intermediate wall is, in embodiments of the invention, fastened to the holder so as to be laterally displaceable in such a way that widths of the compartments are adaptable. When two (or more) infants of equal size (in particular width) have to be transported in the holder, the dividing wall can be attached in the centre of the holder. When, however, infants of different width have to be transported, the width of each of the compartments can be adapted to the width of the infant in question. This allows infants of differing size to be transported in a comfortable manner without having to make use of additional holders and/or holders embodied specially therefor.

The known child buggy is relatively unstable. In particular in the narrow state, the child buggy is relatively top-heavy, and the child buggy can topple over relatively suddenly when taking a bend. Embodying the child buggy in such a way that the width of the first holder is between 60% and 80% of the total width of the frame in the first width provides a relatively wide undercarriage, leading to a stable child buggy. The holder can be placed out of the centre of the child buggy, so that at one side of the frame there is space for placing a second load, such as for example a storage element, thereon.

The ratio between the second width of the frame and the first width of the frame may be between 1.1 and 1.4. Preferably, this ratio is equal to approximately 1.25. In this way, the difference between the two widths is relatively small, and the child buggy has to be widened over just a small distance in order to reach the second width. This benefits the stability of the child buggy and the rigidity of the frame in both widths.

In one embodiment, the width of the frame in the first width is approximately 60 cm, and the width of the frame in the second width is approximately 74 cm. These measurements ensure that the child buggy offers in a second width sufficient space for two infant seats. In the first width, a stable child buggy is obtained, there also being sufficient space to place a load, such as for example a shopping bag or nappy bag, next to the first infant seat.

The frame can be provided with a telescopic rod assembly with an exterior rod and an interior rod which is movable therein in order in this way to adjust the frame between the first width and the second width. An assembly of this type is relatively inexpensive. It also offers a relatively simple, precise and strong solution for making a frame adjustable.

In one embodiment, the rod assembly is provided with limiting elements to be used for limiting the extendability of the frame, in such a way that, in a second width of the frame, the overlap between the exterior and interior rods is at least 25% of the length of the longest of these rods. The known child buggy has the drawback that the durability leaves much to be desired. In particular in the wide state, and during complete loading, high forces are released on the rod mechanism. This can cause the frame of the child buggy to sag. In particular the central part of the known frame, the point at which the telescopic rods meet, will as a result have to accommodate the highest forces. This can lead to fatigue fracture. By ensuring that, in a widest width, the overlap between the extendable rods is at least 25%, a rigid construction is obtained and sagging of the central part of the frame is prevented. This increases the durability of the child buggy. The limiting elements ensure that the rods cannot be slid, during extending thereof, further than the widest width. This prevents the frame of the child buggy from being loaded in an incorrect manner.

The rod assembly is preferably provided with fixation elements to be used for fixing the telescopic movement of the rod assembly. This allows the rod assembly to be secured in a desired width. Preferably, the frame is provided with at least two telescopic rod assemblies, the exterior rod of the first assembly being fastened, with respect to the exterior rod of the second assembly, to an opposing side of the frame. This ensures that the relatively more rigid pipes of the two assemblies, that is to say the thicker exterior rods, are provided on both sides of the frame. This increases the rigidity and durability of the construction. It is in this way also possible to distribute the forces acting on the frame in a somewhat symmetrical manner in the frame.

In a further embodiment, the child buggy comprises:
brake elements so as to be able to block a first wheel and second wheel provided on both sides of the frame;
an operating element, in particular a pedal, for operating a brake element pertaining to the first wheel;
a transmission mechanism between the operating element and the opposing second wheel for operating a brake element pertaining to the second wheel;
wherein the length of at least a part of the transmission mechanism can be adapted to the variation of the distance between the aforementioned wheels during the adapting of the width of the adjustable frame. This construction allows wheels attached to opposing sides of the adjustable frame to be braked and/or blocked, irrespective of the width of the frame.

In one embodiment, the transmission mechanism comprises:
a first rotatable transmission component pertaining to the first brake element;
a second rotatable transmission component pertaining to the second brake element;
a transmission element, which is attached at least partially in the first transmission component, between the first and second transmission components, the transmission element being displaceable in a transmission component between a first position corresponding to the relatively small frame width and a second position corresponding to a relatively large frame width and the transmission element and transmission components being configured to transmit rotation from one transmission component to the other transmission component. In this way, it is possible to provide, with a relatively simple and sturdy construction, an operating mechanism acting on both wheels, irrespective of the width of the frame and thus the mutual distance between the wheels.

In one embodiment, the first fastening element comprises a first exterior guide placed close to a side edge of the frame and a first central guide placed set apart therefrom, close to a central part of the frame, which guides are configured for detachably placing the first load thereon, and the second fastening element comprising a second exterior guide placed close to a side edge of the frame and a second central guide placed set apart therefrom, close to a central part of the frame, which guides are configured for detachably placing the second load thereon, the first exterior guide and the second exterior guide being placed at opposing sides of the frame. A construction of this type ensures that a first load and a second load can be fastened to the child buggy in a simple manner. By using two guides for each load, the load can be placed on the frame in a relatively stable and safe manner.

It is possible for the first and second central guides to be able to be placed in a non-active state, in such a way that the assembly made up of the first and second exterior guides forms a third fastening element for placing a third load thereon. The fastening elements can be fastened in line to the frame. By removing or by displacing the central guides, the two exterior guides can be used to place a third load on the frame. The third load then has a width which is equal to the width of the frame.

It may be that the first and second central guides are rotatable in order in this way to bring the guides into a non-active state. The element of rotation allows the central guides to be brought outside the fastening plane of the loads, in such a way that the guides do not obstruct the fastening of the loads. On the other hand, the rotation does ensure that the guides are still fastened to the child buggy. This prevents the guides from becoming detached and lost. It is also possible to return the guides at any desired moment, in such a way that they can be used for fastening a load thereto. The rotation of the guides is preferably protected, so that the rotation cannot take place accidentally.

It is possible for the third load to comprise a third holder for placing an infant therein. However, other applications are also possible. It is, in addition, possible for the third holder to be placed relatively centrally on the frame. This is particularly advantageous when it is not necessary to transport two loads.

In one embodiment, a width of the third holder is greater than the width of the first holder. It is possible for the third load to be able to be placed on the child buggy in both a first width and a second width of the frame. The third load may for example be a relatively wide infant seat, the width of this infant seat being greater than the width of the first holder for placing an infant therein. The possibility afforded by the child buggy of transporting various loads, having various dimensions, and in various widths of the child buggy, makes the child buggy particularly diverse and flexible.

In order to increase the stability of the child buggy, the frame can, in a further embodiment, be moved on a large number of wheels positioned close to the ends of the adjustable frame. The frame can be set so as to be less wide or wider, depending on the stability requirements. After all, in the case of a wider frame, the stability is, generally speaking, greater than when the frame is set to be less wide.

In one embodiment, the width of the frame is adjustable substantially continuously between the first width and second width. This possibility of continuously (in particular steplessly) adjusting the width of the frame allows the frame to be fixed in any desired intermediate position. If, for example, the second load is a storage element, the width of the storage element, and thus the storage capacity thereof, can be steplessly set. The available storage capacity can thus be adapted simply and rapidly to the user's specific requirements.

In an advantageous embodiment, a holder, for holding an infant therein, and also a storage element, for storing goods therein, are fastened to the frame, the holder and the storage element being placed at a substantially equal height next to each other. This allows the user to easily obtain access to the content both of the holder and of the storage element. Furthermore, objects, such as toys and the like, can be fastened to the storage element so that the infant, who is located at roughly the same height, can play with the objects.

One aspect of the invention provides a storage element for placing goods, such as for example shopping, therein, which storage element can be placed on a child buggy according to the present invention, the width of the storage element itself being adjustable between a minimum width and a maximum width. A storage element of this type can be placed on the child buggy both in the first width of the frame (in which the storage element has a minimum width) and in the second width of the frame (in which the storage element has a maximum width). This provides a flexible storage element, the width of which can be adapted as desired.

According to one embodiment, the storage element comprises a bottom and circumferential walls and at least a part of the circumferential walls is embodied in a flexible manner for increasing or reducing the size of the storage space by adapting the width. It is advantageous if the width of the storage element, just like the width of the frame of the child buggy as in the embodiment mentioned hereinbefore, is steplessly adjustable, thus allowing the storage space offered by the storage element to be set with precision.

Further advantages, features and details of the present invention will be clarified in the following description of certain embodiments thereof. The description refers to the appended figures, in which:

FIGS. 6A and 6B are schematic front views of a child buggy provided with an embodiment of a widenable holder, with the frame and the holder in the starting state and in the widened state respectively;

In the embodiments of the invention that are described in the present document, the child buggy is provided with one or more holders in the form of infant seats in which infants sit down. In other embodiments (not shown) of the invention, the holder is formed by a cot in which an infant usually lies down. It will be clear that the holder may also have an intermediate form, that is to say a holder in which the infant can both lie down and sit down.

Figure 1:
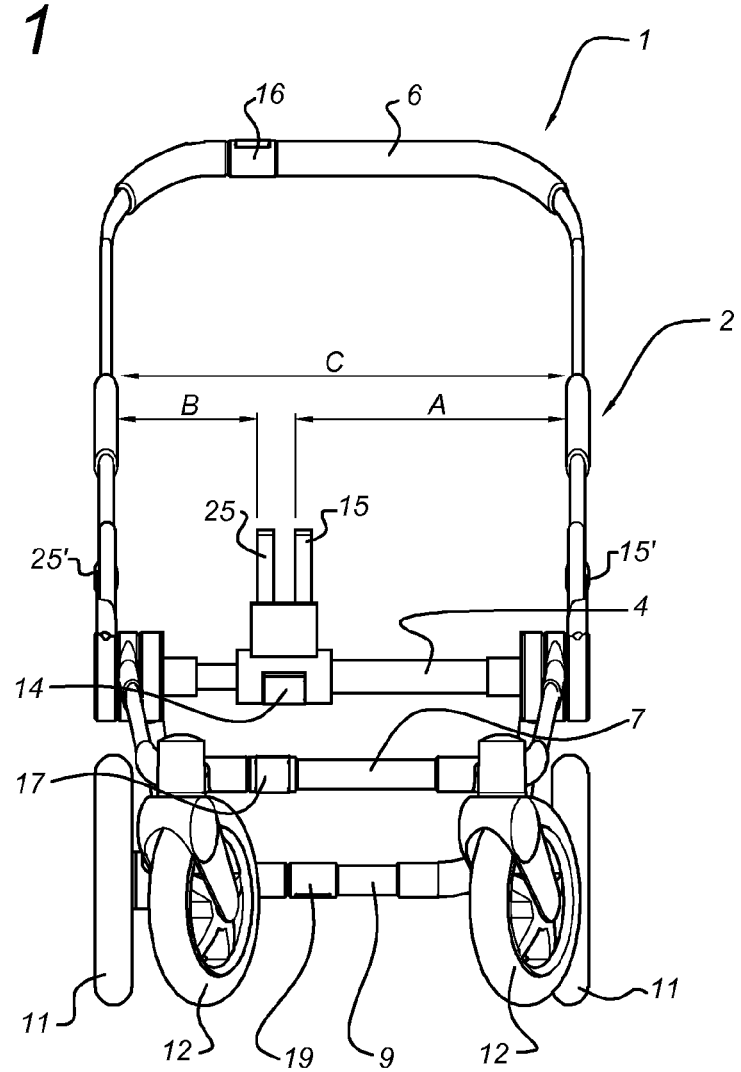
FIG. 1 is a front view of a child buggy with the frame in a first width.

FIG. 1 shows a child buggy 1 comprising a frame 2. The frame 2 is placed in a first width (the width being defined as the maximum dimension in the width direction, perpendicular to the longitudinal direction (generally corresponding to the direction of travel)). The frame 2 is provided with a central rod assembly 4, 4', a front rod assembly 7 and a back rod assembly 9. The frame 2 is also provided with a push rod 6. Two front wheels 12 are placed on the front rod assembly 7 on both sides. Two rear wheels 11 are placed on the back rod assembly 9. The central rod assembly 4, 4' comprises a hollow, first central pipe 4 with, suspended therein in a slidable manner, a second central pipe 4'. The rod assembly 4, 4' is provided with central fixation elements 14 to be used for locking the movement of the second central pipe 4' with respect to the first central pipe 4. Front fixation elements 17 and back fixation elements 19 are respectively provided for locking both the front rod assembly 7 and the back rod assembly 9. The push rod 6 is also provided with fixation elements 16.

The central rod assembly 4, 4' is also provided with first fastening elements 15, 15' and second fastening elements 25, 25' for fastening respectively a first load and a second load (which for the sake of clarity are not shown in the figures) thereto. The fastening elements each comprise two guides 15, 15', 25, 25' over which suitable receiving elements can be slid. In this way, it is possible to place a load, provided with these receiving elements, on the frame 2. The first load may for example be an infant seat. The second load may then be for example a storage element for placing, for example, shopping therein. The width between the guides 15, 15' of the first fastening elements 15, 15' is denoted by A; the width between the guides 25, 25' of the second fastening elements 25, 25' is denoted by B. In the first width of the frame as shown, the width A is equal to approximately 60% of the total width of the frame and the width B is approximately equal to 40% of the total width of the frame. Preferably, the width A is selected in such a way that the ratio between the width A and the total width of the frame is between 60% and 80%.

It is in addition possible to place the two interior guides 15, 25 in a non-receivable position, for example by rotating the guides about the rod assembly 4, 4'. It is in addition conceivable for the guides 15, 25 to be detachable from the frame. This makes it possible to use the two exterior guides 15', 25' in order to place thereon a load provided with receiving elements. The width between the receiving elements should then be equal to the width C between the two guides 15', 25'. The width C is, in the embodiment shown, equal to approximately 100% of the width of the frame.

Figure 2:
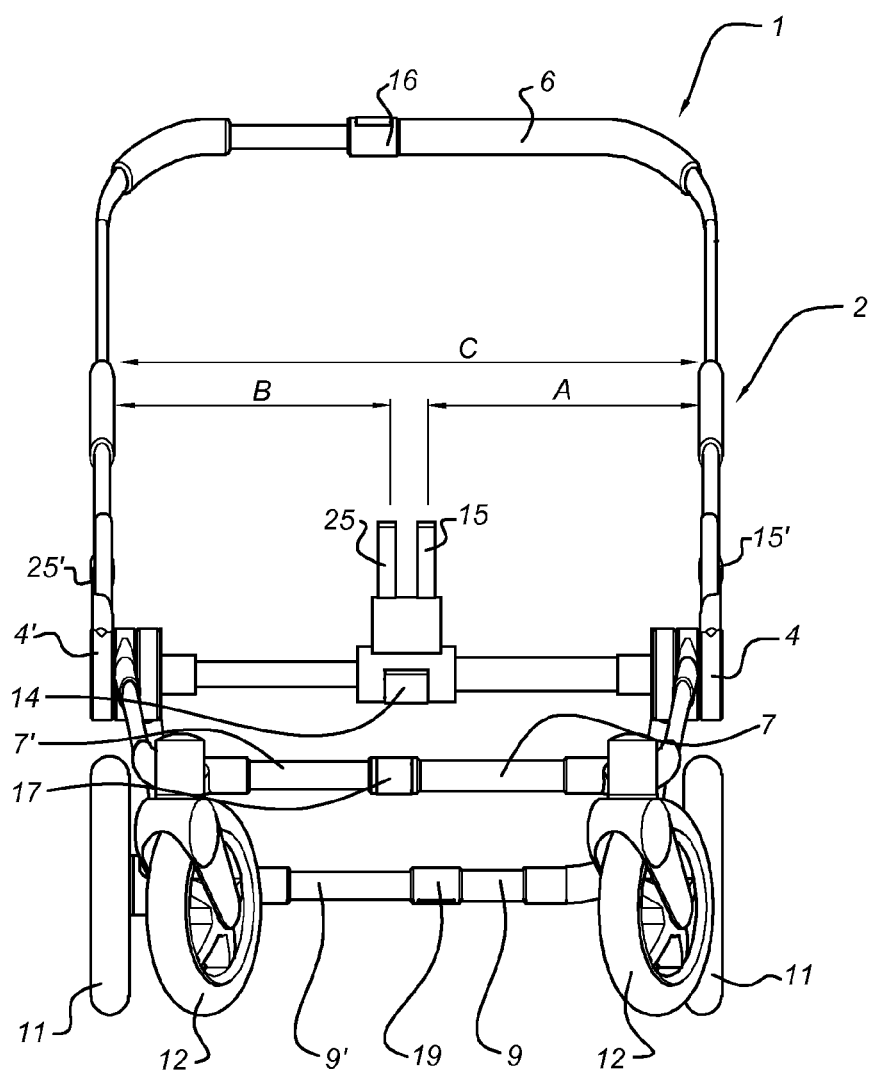
FIG. 2 is a front view of a child buggy with the frame in a second width.

In one embodiment of the invention, the second width is selected so as to be approximately equal to 125% of the first width. FIG. 2 is a front view of the child buggy 1 in a second width of the frame 2. Again, the frame 2 may be seen, with at an underside thereof the front wheels 12 and the rear wheels 11. The frame 2 is set in the second width by uncoupling the fixation elements pertaining to each rod assembly and by subsequently extending the rod assembly by sliding the interior pipe with respect to the exterior pipe. For this purpose, before the front rod assembly 7, 7', an interior pipe 7' is slidably suspended in the exterior pipe 7. The pipes can be fixed using the fixation element 17. Before the back rod assembly 9, 9', an interior pipe 9' is slidably suspended in the exterior pipe 9, and the pipes can be fixed using the fixation element 19. The central rod assembly 4, 4' is provided with an interior pipe 4' which is slidably suspended in the exterior pipe 4. These pipes can be fixed using the fixation element 14. The push rod is also provided with a rod assembly 6, 6', as a result of the fact that an interior pipe 6' is slidably suspended in the hollow push rod 6. The push rod can be fixed using the fixation element 16. In the embodiment shown, at least two exterior pipes are placed with respect to one another at opposing sides of the frame 2. In this case, the central exterior pipe 4 is placed at the right side of the frame, and the exterior pipe 9 of the back rod assembly is placed at the left side of the frame. A construction of this type ensures that the frame can easily be moved between a first width and a second width. In addition, it increases the sturdiness and rigidity of the construction.

The first width, as is represented in FIG. 1, is the smallest width of the child buggy. In order to prevent the width of the frame from becoming even smaller, the frame is provided with a number of limiting elements which are used to limit the freedom of movement of the rods of the rod systems 7, 7', 9, 9' and of the push rod 6. FIG. 1 shows that the front rod system 7, 7' and the back rod system 9, 9' are respectively provided with limiting elements 27 and 28, thus counteracting further displacement of the rod 7', 9'. The push rod 6 is also provided with a limiting element 29, thus giving the push rod an appropriate width corresponding to the width of the remainder of the frame.

As was previously stated, the frame 2 can be adjusted from the first width so that it obtains a larger, second width. The front and back rod systems 7, 7', 9, 9' are provided for this purpose with further limiting elements (not shown). The limiting elements of the rods 7', 9' may be formed by protrusions which are provided at the respective ends and can arrive at corresponding abutment in respective pipes 7 and 9. The limiting elements therefore ensure that the frame, at a given fixed maximum width (i.e. in this embodiment the second width), cannot be made any wider. If, moreover, it is ensured that, even in the maximum width, the rods of the rod systems 7, 7', 9, 9' (and of course also the rods of the central rod system 4, 4') still overlap to a sufficient degree, a very sturdy and rigid construction is obtained even in the maximum width.

Preferably, the overlap between the interior pipe and the exterior pipe of each rod assembly is, when the frame is in a second width, equal to at least 25% of the length of the longest of these two pipes. In the embodiment shown, the interior pipes are embodied as the longest pipes. In the second width of the frame, at most 75% of the interior pipe is visible from the outside. The overlap between the pipes ensures that the frame maintains a desired sturdiness and rigidity, in both the first and the second width.

In the embodiment shown, the width of the frame is, in the first width, approximately equal to 60 cm. In the second width, the width is approximately equal to 74 cm. Other dimensions are however also conceivable, without thereby departing from the inventive idea.

It is possible for the frame to be able to be set steplessly between the first width and the second width. In this way, any desired width can be set. Non-stepless setting is however also conceivable. For the sake of safety, the various fixation elements 14, 16, 17, 19 should be secured after the frame 2 has been set in the desired width.

In the second width of the frame 2, the width B between the second fastening elements 25, 25' has increased. As a result of the fact that the central guides 15, 25 are fastened to the exterior pipe 4, the distance between the first central guide 15 and the first exterior guide 15' has not increased. As a result, it is possible to place the first load on the child buggy also in the second width of the frame 2. Conversely, the width B between the second central guide 25 and the second exterior guide 25' has increased. In the second width of the frame 2, the first width I is approximately equal to the second width B. As a result, the first load, for example an infant seat, can be placed on both the first and the second fastening elements. It is in addition possible to use the second fastening elements for placing a second load having a larger width. The second load may for example be a second infant seat, thus providing a child buggy having a double seat. It is also possible for the second load to be a shopping holder. It is also possible for the width of the shopping holder to be adjustable, in such a way that the shopping holder can be placed both on a frame having a first width (as shown in FIG. 1) and on a frame 2 having a second width (as shown in FIG. 2). It is in addition possible to form, by folding away or removing the interior guides, a third fastening element 15', 25' having a width C for a third load. The third load can also comprise a holder for an infant. The width of this third holder may then be wider than the width of the first holder. In this way, a heavier and/or larger infant can be transported using the same child buggy.

Figure 3:
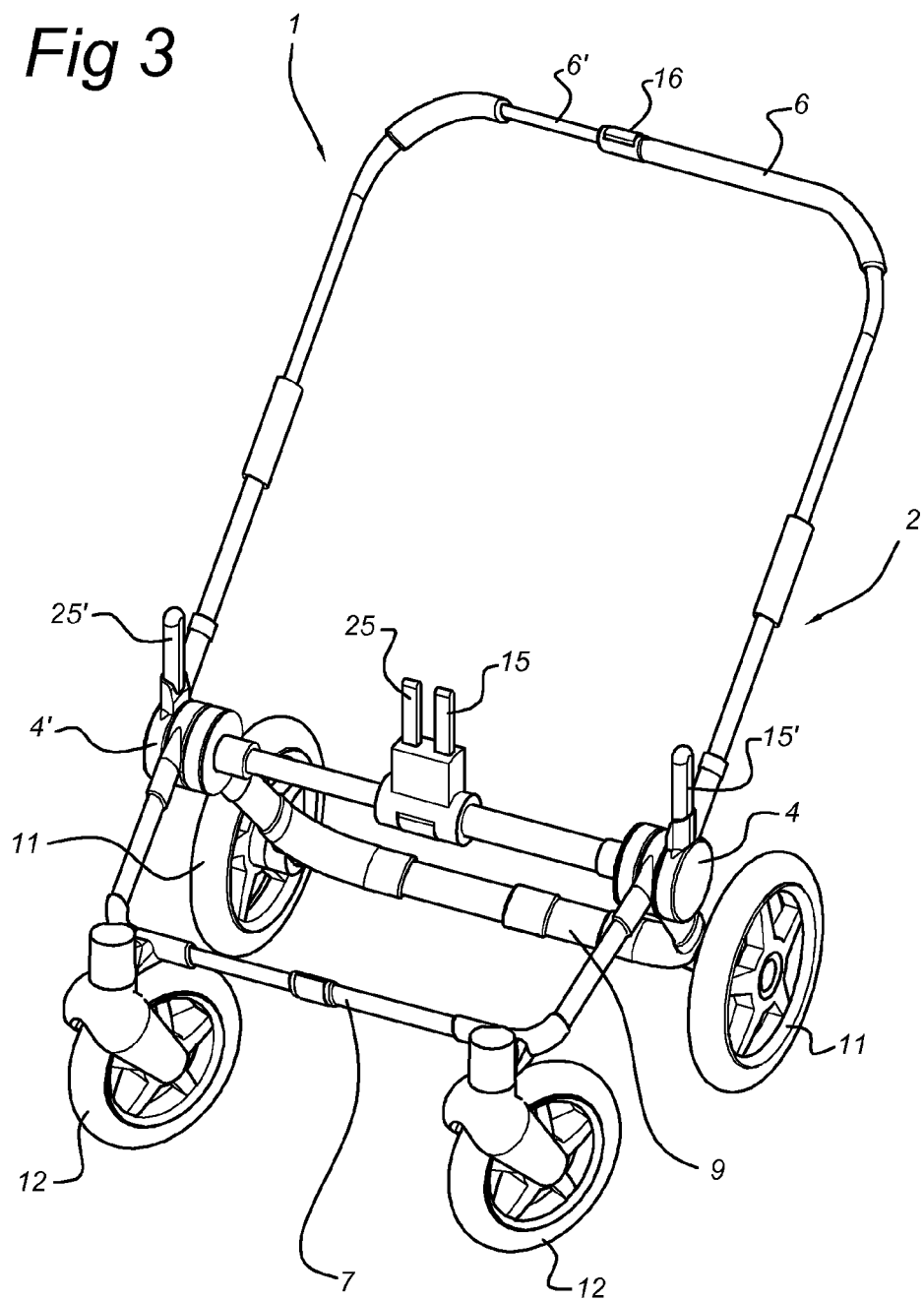
FIG. 3 is a perspective view of a child buggy with the frame in a second width.

FIG. 3 is a perspective view of a child buggy 1 with the frame 2 in a second width. As may be seen, the frame comprises the front rod assembly 7 with, fastened thereto, the front wheels 12, and the back rod assembly 9 with the rear wheels 11. The central rod assembly 4, 4' is provided with the first 15, 15' and second fastening elements 25, 25'. The push rod 6 comprises a handle 6 and an interior rod 6' suspended slidably therein. In the embodiment shown, four telescopic rod assemblies are provided. It is however possible to use just 1 telescopic rod assembly, without thereby departing from the invention. Preferably, use is made of more than one rod assembly, for example of two, three or more rod assemblies, since this increases the rigidity of the frame 2 of the child buggy.

It is possible for the fastening elements 15, 15', 25, 25' to be provided in a different manner. It is for example possible for just one guide to be used for each fastening element. The single guide can then be provided centrally on the interior or exterior pipe. In this way, the advantages of the present invention can be achieved using just a single fastening element. A fastening of this type may, for example, be particularly advantageous for fastening a shopping basket. However, for stable fastening, a double guide is preferable. It will be clear to the person skilled in the art that any embodiment of a fastening element is possible, without thereby departing from the invention.

Figure 4A:
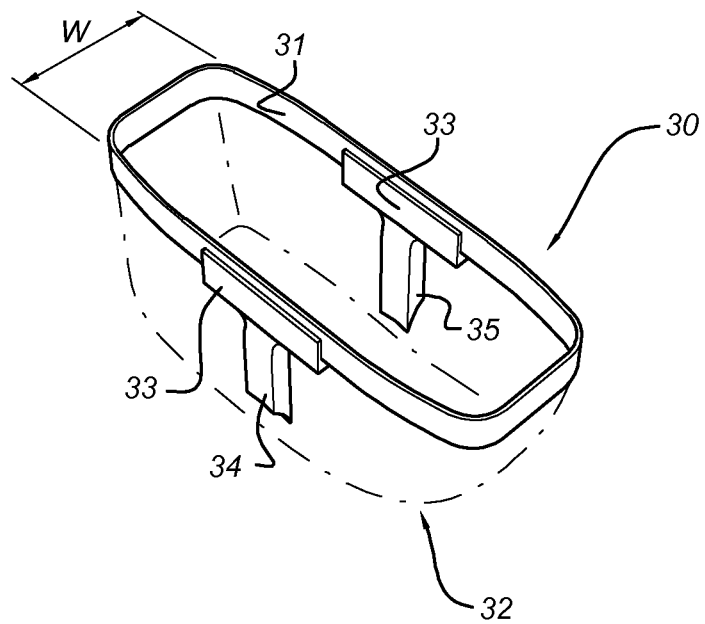
FIG. 4A is a perspective view of an embodiment of a holder for goods, in a state having a relatively small width.
Figure 4B:
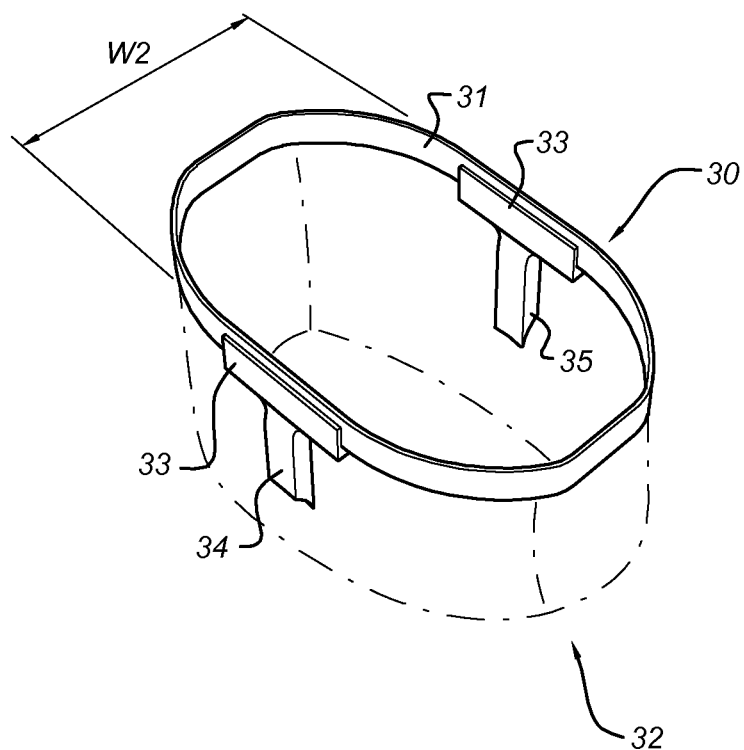
FIG. 4B is a perspective view of the embodiment from FIG. 4B, in a state having a relatively large width.
Figure 5:
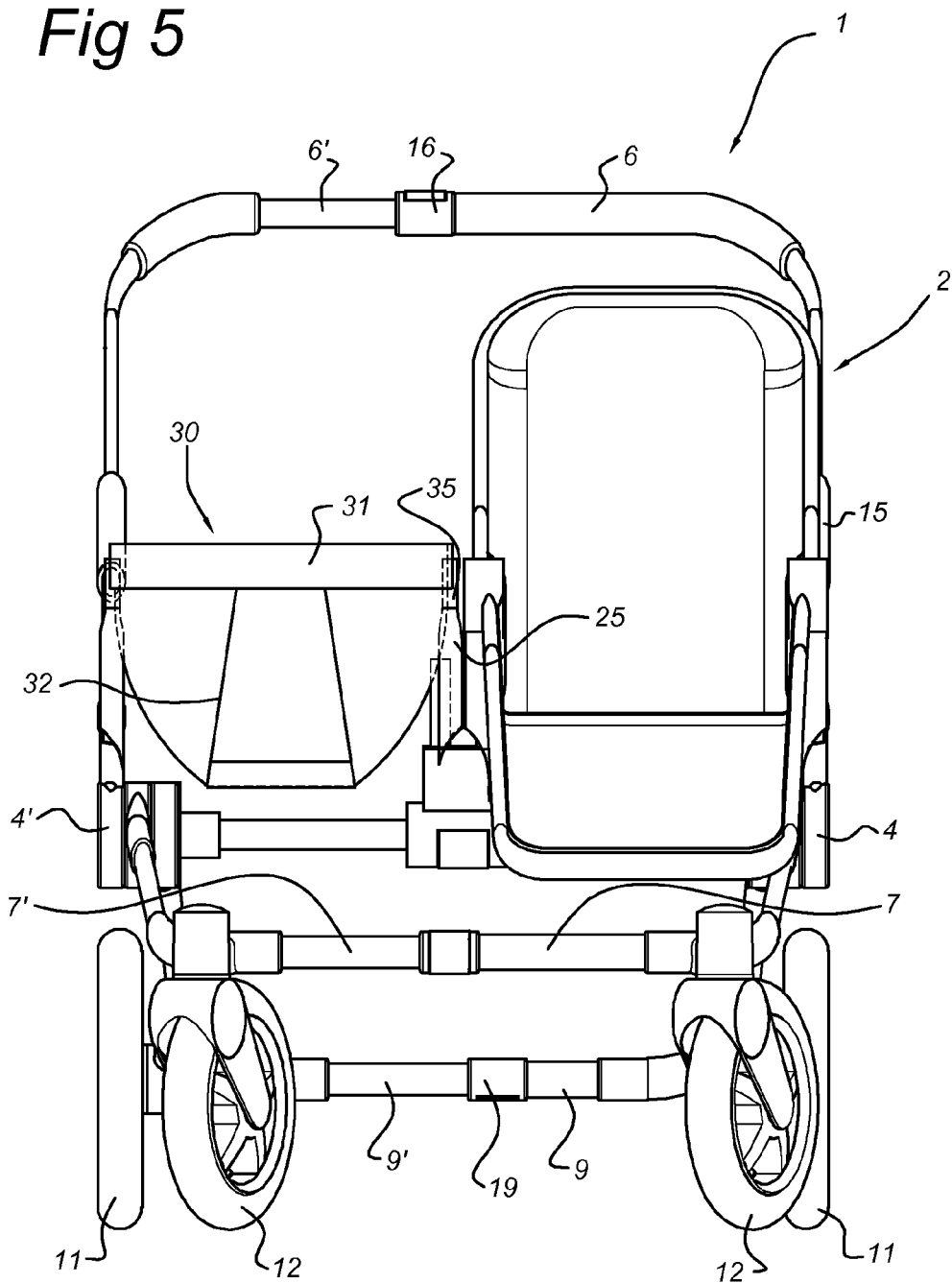
FIG. 5 is a schematic front view of a child buggy provided with a first holder for infants and a second holder for goods, with the frame in the widened state.

FIGS. 4A and 4B show a preferred embodiment of a load carrier, in particular a shopping holder 30, in a narrow state (FIG. 4A) and a wide state (FIG. 4B) respectively. The shopping holder comprises an annular part 31, attached to the underside of which is a sack-shaped element 32, made for example of a suitable fabric. The annular part 31 has an elongated shape and is provided on the two longitudinal parts with supports 33. Each of the supports 33 has an accommodating element 34, 35 which extends substantially at right angles to the part 31 and into which a fastening element 15, 15', 25, 25' can be slid. The part 31 and the sack-shaped element 32 fastened thereto jointly form a holder in which any desired articles, such as items of shopping, can be attached. The annular part 31 is in this case embodied to be sufficiently flexible to allow the width w spanned by the annular part 31 to be varied, for example between the first width $w_1$ represented in FIG. 4A and the second, larger width $w_2$ represented in FIGS. 4B and 5. The sack-shaped element 32 may also be embodied in a flexible manner, but does not have to be. The important thing here is that the storage capacity of the holder, that is to say the volume enclosed by the holder 30, can be made larger and smaller by increasing and reducing, respectively, the size of the width of the holder 30.

In the narrow state of the holder 30 as represented in FIG. 4A, the mutual distance of the left and right accommodating elements 34 and 35 is such as to allow the holder 30 to be slid over the fastening elements 25, 25' when the frame has the first width represented in FIG. 1. In the wide state of the holder 30 as represented in FIG. 4B, the mutual distance of the left and right accommodating elements 34 and 35 is such as to allow the holder 30 to be slid over the fastening elements 25, 25' when the frame has the second width represented in FIG. 2.

FIGS. 6A and 6B show a further embodiment of the invention. In this embodiment, the middle fastening elements 25, 15 are turned away and a single holder 40 is attached to the remaining fastening elements 25' 15'. The holder 40 itself is in this case embodied so as to allow the width thereof to be varied. FIG. 6A shows the frame in the narrow state as previously represented in FIG. 1, whereas FIG. 6B shows the frame in the wide state as previously represented in FIG. 2. Furthermore, FIGS. 6A and 6B show that not just the width of the frame, but also the width (w) of the holder 40 may be varied (steplessly or non-steplessly) between a small width ($w_3$) and a large width ($w_4$). In the embodiment shown, the width of the holder 40 can be varied without the holder having to be removed from the frame. The holder can in this case be embodied in such a way as to be able to follow the alteration of the width of the frame. In other embodiments this is not possible and the holder must first be removed from the frame. Afterwards, the widths of the frame and of the holder 40 can be varied separately from each other.

In the embodiment shown in FIGS. 6A and 6B, the holder 40 is for example constructed from at least a first holder part 45 and a second holder part 46. The holder parts 45 and 46 can be displaced in the lateral direction with respect to each other so that the total width (w) of the holder 40 can be made larger or smaller as desired. In the embodiment shown in FIGS. 6A and 6B, the holder part 46 is placed before the holder part 45. Although this is therefore not directly visible in the front view of FIG. 6A, the holder part 45 runs through over a defined distance at the back of the holder part 46. This is clearly apparent from FIG. 6B. This figure shows the situation in which the holder part 46 is displaced (over a distance of $w_4-w_3$) in direction $P_1$ (FIG. 6A) in order to make the holder 40 wider.

In the embodiment shown, the holder 40 is furthermore provided with a displaceable intermediate wall 41 which forms a division between a left compartment 42 and a right compartment 43. An infant can for example sit down and/or baggage can be deposited in each of the compartments. Depending on the user's requirements, the size of the compartments 42, 43 can be varied, independently of the variation of the width (w) of the holder 40, by lateral displacement of the intermediate wall 41 (directions P). If for example, in the situation shown in FIG. 6B, a larger infant sits down in the right compartment 43 than in the left compartment 41, the intermediate wall 41 is displaced toward the left, making the right compartment 43 larger and the left compartment 41 smaller.

Figure 7A:
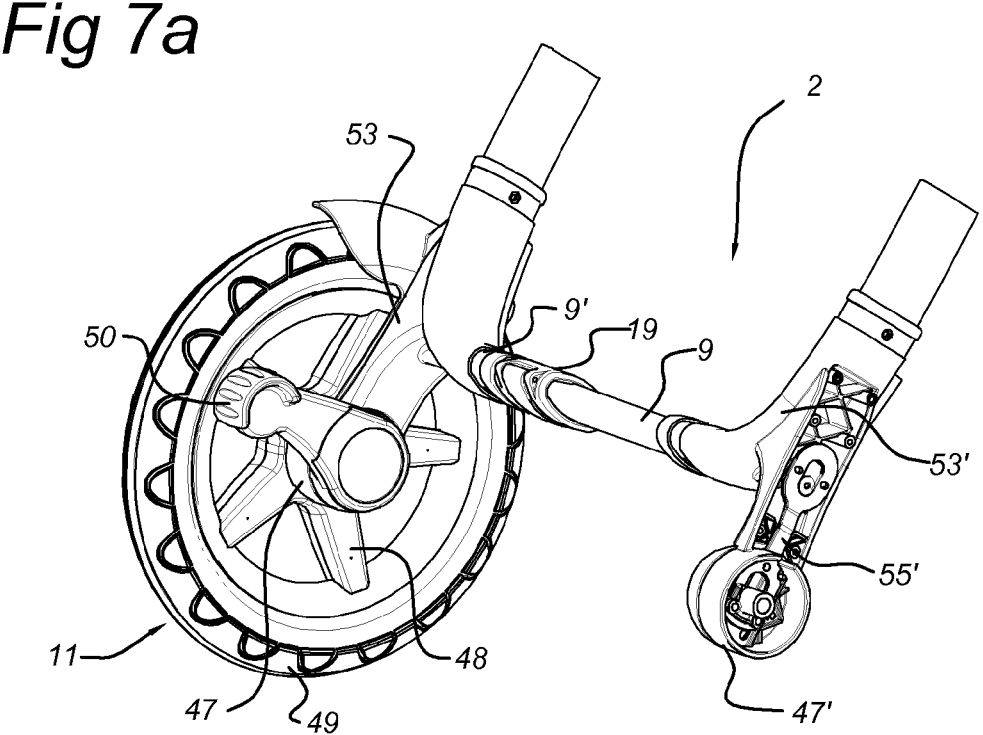
FIG. 7A is a partially exploded, perspective side view of an embodiment of the brake of the child buggy, in a position for a narrow child buggy and with the brake disengaged.
Figure 7B:
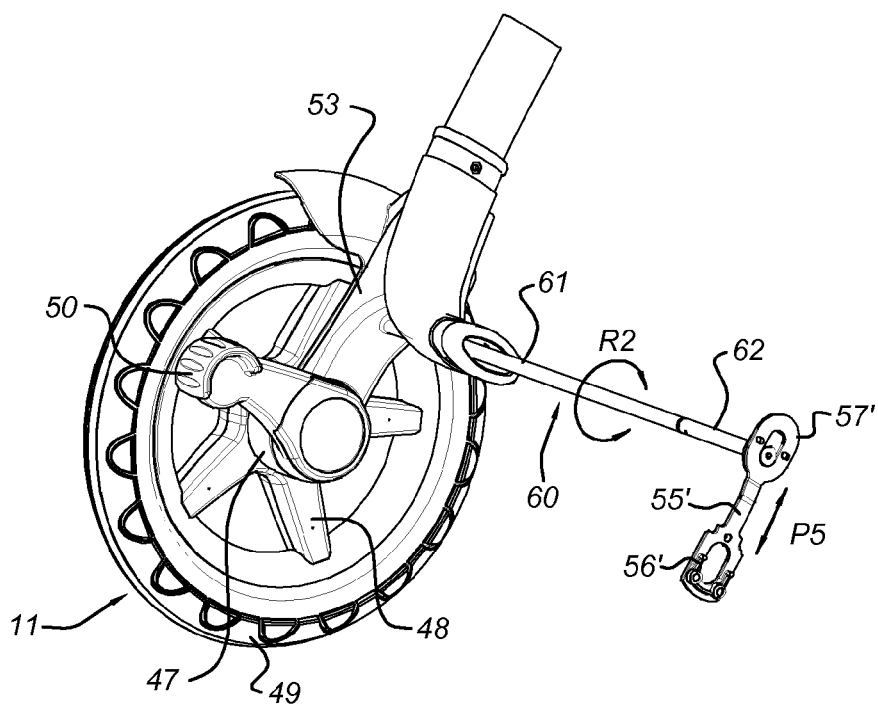
FIG. 7B is a further exploded, perspective side view of the embodiment shown in FIG. 7A.

FIGS. 7A and 7B are partially exploded, perspective views of a preferred embodiment of a brake mechanism for the child buggy from FIG. 1, which brake mechanism is made suitable for varying the width of the frame of the child buggy. Unless otherwise explicitly stated, like reference numerals denote, again, the same or similar parts of the child buggy. FIGS. 7A and 7B represent the rod assembly 9, 9' with the fixation element 19. A wheel 11 is fastened to the rod systems 9, 9', or at least a support 53 thereof. The wheel 11 comprises a central hub 47, a number of spokes 48, a rim and a tyre 49 which is attached around the rim. A similar wheel 11 is of course also fastened to the opposing support 53' (which is represented in partially exploded form in FIG. 7A), but this wheel has been omitted from the drawing for the sake of simplicity.

Figure 8A:
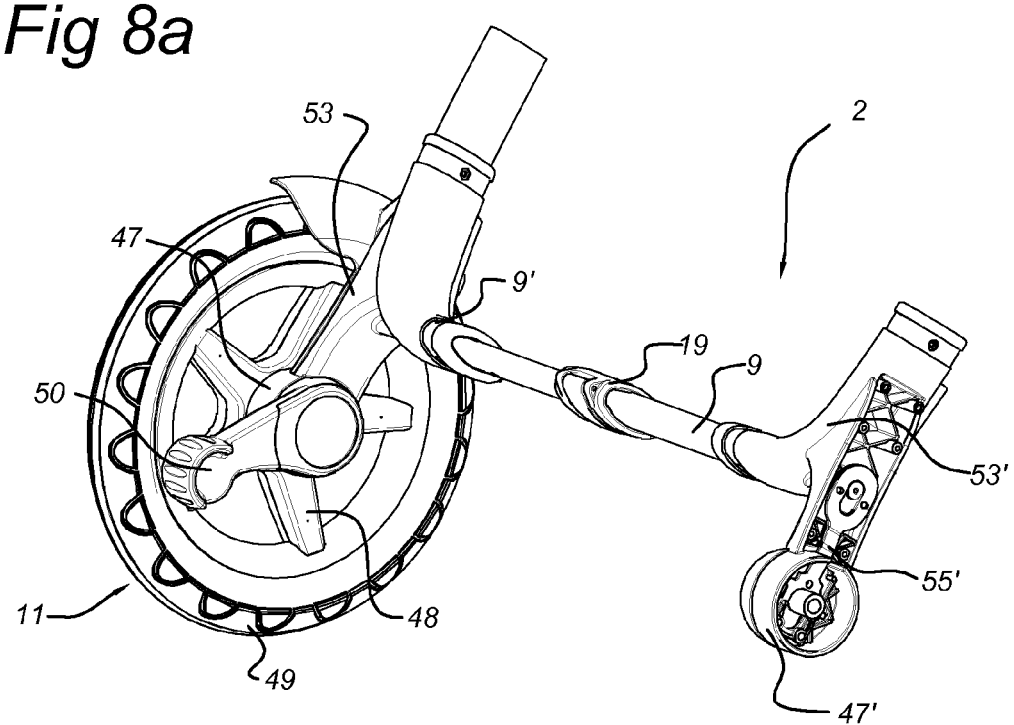
FIG. 8A is a partially exploded, perspective side view of the embodiment from FIG. 7A, in a position for a widened child buggy and with the brake engaged.
Figure 8B:
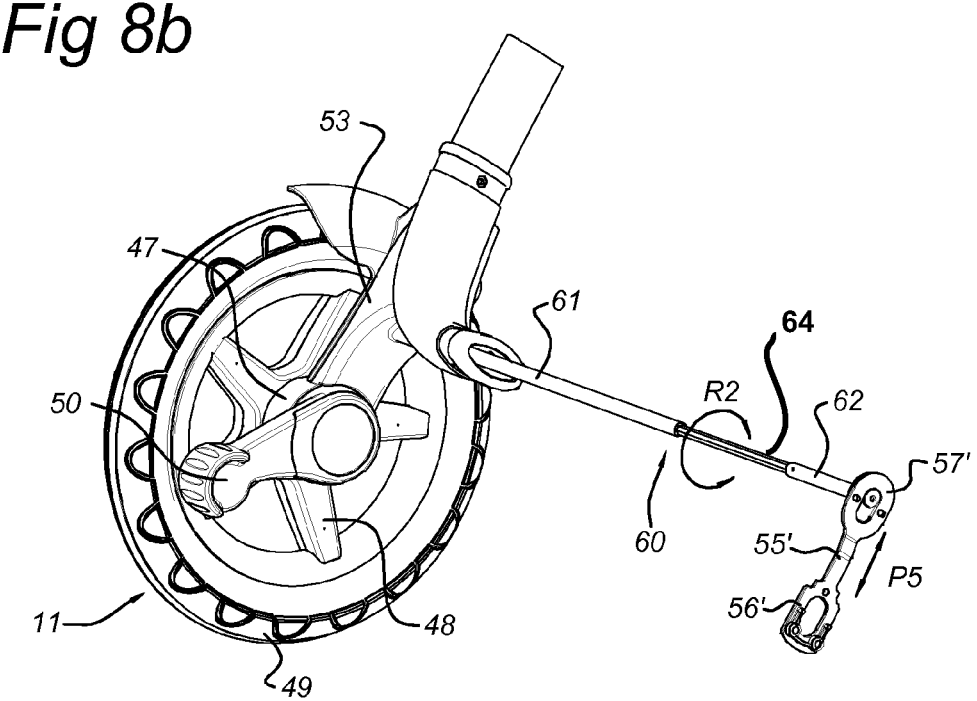
FIG. 8B is a further exploded, perspective side view of the embodiment shown in FIG. 8A.

A wheel axle 54 (FIG. 9) is attached in the support 53, 53'. A pivotable brake pedal 50 is fastened to the wheel axle 54. FIGS. 7A and 7B show the brake pedal 50 in the starting position in which the brake is not active, whereas in FIGS. 8A and 8B the brake pedal 50 has been pivoted downward (direction $R_1$), in which position the brake is active (that is to say, is engaged). The pivoting movement of the brake pedal 50 is transmitted via the axle 54 to a brake provided within the hub 47, 47' of the wheel 11. This brake may be of any desired type and will not be described any further. In the embodiment shown, the brake is configured to be active in the bottom position of the brake pedal 50, as is represented in FIGS. 8A and 8B, and therefore in the case of an axle 54 which has rotated in direction $R_1$, whereas in the top position, and therefore in the case of an axle 54 which has rotated in the opposite direction, the brake is inactive. A brake, which is configured so as to be made active or inactive during operation of the same brake pedal 50, is attached in a similar manner in the opposite wheel 11 (not shown). A transmission mechanism is necessary in order to transmit the pivoting movement from the brake pedal 50 to the brake of the opposing wheel 11. This transmission mechanism must not only transmit the pivoting movement, but must be able to do that irrespective of the (adjustable) width of the frame (and thus of the rod system 9, 9').

One embodiment of the transmission mechanism 60 comprises for this purpose two transmission members 55, 55' which are each provided next to one of the wheels 11. Each transmission member 55, 55' comprises a central part with, at the two ends, an end part 56, 56', 57, 57' provided with an opening. The opening in the bottom end part 56 is embodied in such a way that the transmission member obtains a translatory movement (direction $P_4$, FIG. 9) during rotation of the axle 54 (as a consequence of pivoting of the brake pedal 50). The opening in the top end part 57 is also formed to convert a translatory movement of the transmission member 55 via a component 58 into rotation ($R_2$) of a transmission assembly 60. The transmission assembly 60 is provided within the hollow rod system 9, 9' and is represented in greater detail in FIGS. 7B, 8B and 9. Rotation of the transmission assembly 60 ensures that the transmission member 55' pertaining to the opposing wheel 11 undergoes a corresponding translatory movement (direction $P_5$). This translatory movement is converted in the manner described hereinbefore into rotation of an axle 54 which is used to operate the brake in the wheel 11.

Figure 9:
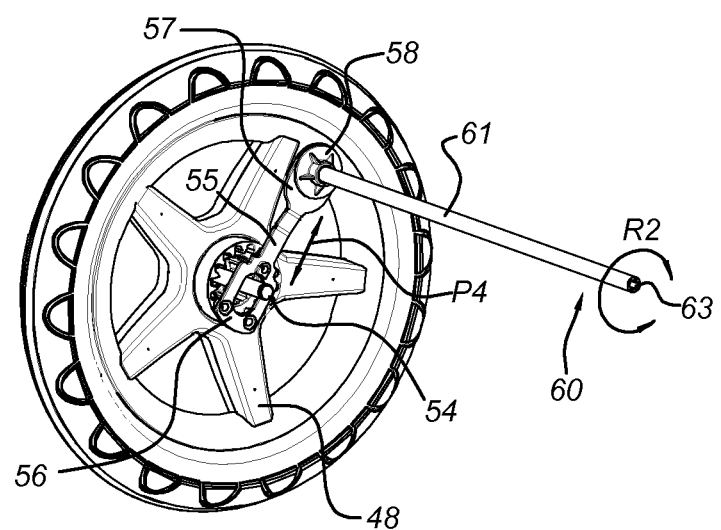
FIG. 9 is a still further exploded, perspective view of a wheel provided with an operating element according to the invention from FIG. 7A-7B.

The transmission mechanism 60 comprises a first transmission component 61 and a second transmission component 62. When the transmission component 61 rotates, then the transmission component 62 also rotates, irrespective of the width of the frame. For this purpose, the transmission component 61 is embodied so as to be partially hollow. FIG. 9 shows that the transmission component 61 has a hollow space 63 having a polygonal (for example an octagonal) shape in cross section. A transmission element 64 (FIG. 8B) is securely fastened to the second transmission component 62. The shape and dimensions of the transmission element 64 are selected in such a way that the transmission element can be slid into the hollow space 63 in the lateral direction, without this necessitating rotation of the transmission element 64 with respect to the first transmission component 61. In the embodiment shown, the outer surface of the transmission element then also defines a polygonal shape corresponding to that of the hollow space 63 of the first transmission component 61. During the widening or narrowing of the frame of the child buggy, i.e. during the adapting of the frame width between for example the first position shown in FIGS. 7A and 7B, corresponding to a relatively small frame width, and the second position shown in FIGS. 8A and 8B, corresponding to a relatively large frame width, the transmission element 64 slides back and forth in the hollow space 63 of the transmission component 61. The transmission mechanism 60 is in this case embodied in such a way that there is at all times, even when the frame is in the widest state, a certain degree of overlap between the transmission element 64 and the first transmission component 61. This allows any rotation to be transmitted by the transmission mechanism 60, by operating the brake pedal 50, to the transmission member 55' of the opposing wheel 11.

The present invention is not limited by the embodiments described in the present document. Rather, the rights applied for are defined by the following claims, within the scope of which a broad range of adaptations and modifications are conceivable.

The invention claimed is:

1. A buggy for transporting infants, comprising:
a frame which is provided with first fastening elements configured to be used for detachably fastening a first load to the frame, the first load comprising a first holder for placing an infant therein,
and which is provided with second fastening elements configured to be used for detachably fastening a second load to the frame,
the width of the frame being adjustable between a first, relatively small frame width and a second, relatively large frame width,
wherein the second fastening elements are configured to be used for detachably fastening, in both the first frame width and the second frame width, the second load next to the first load.

2. The buggy according to claim 1, wherein the second load comprises a storage element for placing goods therein.

3. The buggy according to claim 2, wherein the second load comprises a second holder for placing an infant therein, which in the second frame width, can be placed thereon.

4. The buggy according to claim 3, wherein the storage element and the second holder can be placed alternately on the frame.

5. The buggy according to claim 4, wherein in the second frame width the storage element and the second holder can be placed in an exchangeable manner.

6. The buggy according to claim 2, wherein the width of the storage element is adjustable.

7. The buggy according to claim 3, wherein a width of the second holder is at least roughly equal to a width of the first holder.

8. The buggy according to claim 1, wherein the ratio between the width of the first holder, for placing an infant therein, and the first frame width is between 50% to 80%.

9. The buggy according to claim 2, comprising the first holder for holding an infant therein, and at substantially the same level next thereto, the storage element for placing goods.

10. The buggy according to claim 1, wherein
the first fastening element comprises a first exterior guide placed close to a side edge of the frame, and a first central guide placed set apart therefrom close to a central part of the frame, said first exterior and central guides being configured for detachably placing the first load thereon, and the second fastening element comprises a second exterior guide placed close to a side edge of the frame, and a second central guide placed set apart therefrom close to a central part of the frame, said first exterior and central guides being configured for detachably placing the second load thereon, the first exterior guide and the second exterior guide being placed at opposing sides of the frame.

11. The buggy according to claim 10, wherein the mutual distance between the first guides and/or the mutual distance between the second guides is adapted accordingly during adaptation of the width of the frame.

12. The buggy according to claim 10, wherein the first and second central guides are configured to be placed in a non-active state, in such a way that the assembly made up of the first and second exterior guides forms a third fastening element configured to be used for placing a third load thereon.

13. The buggy according to claim 12, wherein the first and second central guides are rotatable in order to bring the guides into the non-active state.

14. The buggy according to claim 12, wherein the third load comprises a third holder for placing an infant therein.

15. The buggy according to claim 14, wherein a width of the third holder is greater than the width of the first holder.

* * * * *